United States Patent
Yagawa et al.

(10) Patent No.: US 6,751,598 B1
(45) Date of Patent: Jun. 15, 2004

(54) DIGITAL CONTENT DISTRIBUTION SYSTEM AND PROTECTION METHOD

(75) Inventors: Yuichi Yagawa, Yokohama (JP); Koichi Sano, Yokohama (JP)

(73) Assignee: Hitachi, Ltd., Toyko (JP)

( * ) Notice: Subject to any disclaimer, the term of this patent is extended or adjusted under 35 U.S.C. 154(b) by 138 days.

(21) Appl. No.: 08/887,251

(22) Filed: Jul. 2, 1997

(30) Foreign Application Priority Data

Jul. 3, 1996 (JP) .............................................. 8-172720

(51) Int. Cl.[7] .............................................. G06F 17/60
(52) U.S. Cl. .............................. 705/51; 705/57; 380/201
(58) Field of Search .............................. 705/24, 51, 59, 705/57; 380/4, 201–204; 369/275, 100, 900, 38, 47, 48, 54–58

(56) References Cited

U.S. PATENT DOCUMENTS

| | | | |
|---|---|---|---|
| 3,527,527 A | | 9/1970 | Manowitz ..................... 360/27 |
| 4,796,220 A | * | 1/1989 | Wolfe .......................... 364/900 |
| 4,879,704 A | * | 11/1989 | Takagi et al. .................. 369/14 |
| 4,965,680 A | | 10/1990 | Endoh .......................... 360/60 |
| 4,975,898 A | * | 12/1990 | Yoshida ....................... 369/100 |
| 4,979,210 A | | 12/1990 | Nagata et al. .................. 380/3 |
| 5,054,064 A | * | 10/1991 | Walker et al. .................. 380/5 |
| 5,103,392 A | | 4/1992 | Mori .......................... 395/725 |
| 5,173,886 A | * | 12/1992 | Satoh et al. ................... 369/32 |
| 5,185,717 A | | 2/1993 | Mori .......................... 365/52 |
| 5,208,708 A | | 5/1993 | Mok ........................... 360/60 |
| 5,283,779 A | * | 2/1994 | Otsuki ..................... 369/275.2 |
| 5,287,408 A | * | 2/1994 | Samson ......................... 380/4 |
| 5,291,554 A | | 3/1994 | Morales ........................ 380/3 |
| 5,309,387 A | | 5/1994 | Mori .......................... 365/52 |
| 5,315,448 A | | 5/1994 | Ryan .......................... 360/60 |
| 5,321,673 A | * | 6/1994 | Okazaki ....................... 369/13 |
| 5,379,433 A | * | 1/1995 | Yamagishi .................... 395/725 |
| 5,394,274 A | | 2/1995 | Kahn .......................... 360/60 |
| 5,410,598 A | | 4/1995 | Shear ........................... 380/4 |
| 5,418,852 A | * | 5/1995 | Itami et al. ..................... 380/4 |
| 5,509,074 A | | 4/1996 | Choudhury et al. ............ 380/23 |
| 5,513,260 A | | 4/1996 | Ryan ............................ 380/3 |
| 5,532,920 A | | 7/1996 | Hartrick et al. .............. 707/500 |
| 5,555,304 A | * | 9/1996 | Hasebe et al. .................. 380/4 |
| 5,570,339 A | * | 10/1996 | Nagano ..................... 369/275.4 |
| 5,671,276 A | * | 9/1997 | Eyer et al. ...................... 380/4 |
| 5,684,785 A | * | 11/1997 | Itami et al. ............... 369/275.2 |
| 5,812,662 A | * | 9/1998 | Hsu et al. ...................... 380/4 |
| 5,867,579 A | * | 2/1999 | Saito .......................... 380/25 |

FOREIGN PATENT DOCUMENTS

| | | | | |
|---|---|---|---|---|
| EP | 43 21 799 C1 | * | 6/1993 | ........... G11B/23/28 |
| WO | WO 91/03011 | * | 5/1991 | ............. G06F/1/00 |

OTHER PUBLICATIONS

Controlling copyright infringements of intellectual property: The case of computer software—Part Two; Journal of Systems Management; Cleveland; Jul. 1994; Malhotra, Yogesh.*

* cited by examiner

*Primary Examiner*—Eric W. Stamber
*Assistant Examiner*—Yehdega Retta
(74) *Attorney, Agent, or Firm*—Mattingly, Stanger & Malur, P.C.

(57) ABSTRACT

In a digital content distribution method and system, a storage medium is composed of a ROM area in which a key is stored and a RAM area in which a digital content is stored. A storage medium certification unit of a terminal equipment judges whether or not the key of the storage medium exists in the ROM area. Thereby, the use of an illegal copy of the digital content is prevented. If the key is valid, a digital content execution unit of the terminal equipment reads the digital content and executes it. A digital content updating unit of the terminal system transmits to a distributor a request for transmission of the digital content together with a user profile code. The distributor refers to a user management file to check the validity of the user profile code and the number of times of distribution. If they are valid, the latest edition of the digital content is transmitted to the terminal system so that the digital content is updated by the digital content updating unit. Thereby, the distribution and version-up of a digital content are facilitated.

7 Claims, 9 Drawing Sheets

DIGITAL CONTENT DISTRIBUTION SYSTEM AND PROTECTION METHOD

BACKGROUND OF THE INVENTION

The present invention relates to a system for distributing a digital content such as software, digital publication or the like and a method for protecting a digital content from illegal copying.

In recent years, the distribution of game software or software programs (hereinafter referred to as software) by CD-ROM or network to users has begun to become prevalent and popular in association with the lowering of the cost of CD-ROMS and the consolidation of network environments. At the same time, the provision of information by CD-ROM or network to subscribers has also begun to become popular with the advance of digitization of information. Information thus provided includes text information such as a digital newspaper or publication, multimedia title information created through the composite use of still pictures or images, and so forth. In the present invention, a work produced assuming the distribution and use thereof as digital information as mentioned above is called digital content. It may be considered that a service for not only the distribution of such a digital content through CD-ROM or network but also the occasional updating or version-improvement of the digital content will appear in the future.

In a system for distributing such digital contents, a scheme for protecting the right of a producer of a work (hereinafter referred to as digital author) and effecting the proper payment of counter values such as digital content use charges from users to the digital author is important. So far as the environments in which digital contents can be distributed without anxiety are not consolidated, the author will be kept troubled with illegal uses.

In the conventional superdistribution technique, an accounting is performed using a security system in which plain texts (or decrypted information) are obtained only in a dedicated processor incorporated in an equipment. Namely, the frequency of use of information is calculated regarding the use as being made each time a decrypting process is performed by the dedicated processor. This frequency of use is occasionally sent to an accounting center and the accounting center side collects a charge corresponding to the frequency of use from a user. Since the distributed information is all encrypted, the copy thereof itself is not worthy of use. In order to use the information, it is necessary to decrypt it by the dedicated processor. Each time the decryption is performed, the frequency of use is counted. As a result, the payment of a counter value for use is materialized. A digital content distribution system based on such a method is generally called superdistribution system. U.S. Pat. No. 5,410,598 issued to V. H. Shear discloses a database usage metering and protection system.

The conventional superdistribution system includes a problem that there is a need to incorporate the dedicated processors into all users' equipment and the accounting center performs an accounting management including the one-by-one collection of use frequencies counted by the dedicated processors, which makes the whole of the system complicated and therefore makes the cost of introduction of the system high. The superdistribution system is rather high in cost as a scheme for implementing, for example, digital newspapers or digital publications. Taking the case of the newspaper by way of example, on-time information is important and the use such as repeated reading is uncommon. A contract such as the current newspaper (in a paper form) subscription contract by the month is preferable than a contract based on the frequency of use. That is, a digital newspaper by the superdistribution system becomes higher in cost by a value corresponding to the use frequency management and the accounting management at the accounting center. The superdistribution system is rather suitable for the case where legacy digital documents are utilized at a digital library or the like. Namely, it can be said that the superdistribution system is suitable for an accounting management based on a so-called meter rate system but becomes high in cost as a method for implementing applications aimed at a fixed rate system.

SUMMARY OF THE INVENTION

An object of the present invention made for solving the above problem is to provide a digital content distribution system in which the use of the illegal copy of a digital content can be prevented and the digital content can expediently be utilized by a user.

Another object of the present invention is to provide a system which facilitates the version-up or updating feature of a digital content for a user.

A further object of the present invention is to provide a digital content distribution system which is suitable for a fixed rate system with a charge for use of a digital content fixed irrespective of the frequency of use.

A digital content protection system for a present invention for reading a digital content from a communication network and processing it includes a drive system for making an access to information in a storage medium mounted thereto, a judging section connected to the drive system for reading a code from a predetermined location on the storage medium to judge whether or not the location exists in a read only storage area and to judge whether or not the code matches with a predetermined code (key), and a digital content access permitting section for permitting the decoding of the digital content read through the communication network, the permission being made when it is determined as the result of judgement by the judging section that the location is in the read only storage area and the code matches with the predetermined code. The digital content access permitting section decodes a program included in the digital content and executes the decoded program. The digital content read through the communication network is stored in a rewritable area of the storage area and is updated by the program stored in the read only storage area. The information about the predetermined location and the predetermined code which are used in the judging section are also read through the communication network and are stored in a rewritable area of the storage medium. In order to optically judge whether or not the location exists in the read only storage area, the judgement is made of whether or not a light beam reflection factor of the location of the storage medium is higher than a predetermined value. The storage medium may have a plurality of different keys in the read only storage area so that a distributor can transmit to the communication network that one of a plurality of location addresses which corresponds to the date.

A storage medium according to the present invention includes a read only storage area in which a predetermined code is stored at a predetermined storage location and a rewritable storage area in which a digital content is stored. A method of the present invention performed by a computer includes a step of reading a code from a predetermined storage location of a storage medium to judge whether or not the storage location exists in a read only storage area of the storage medium and to judge whether or not the code is a predetermined code, and a step of reading, when the storage location and the code are valid, a digital content from a rewritable storage area of the storage medium for program execution or data reference. With this method, since the computer checks the existence of the predetermined code in the read only storage area, it is possible to eliminate an illegal copy of the digital content by a storage, medium the whole of which is a rewritable storage area.

Also, a digital content distributing system according to the present invention is composed of a terminal system for performing the reading and writing of information for a storage medium and a distributor connected to the terminal system through a network for distributing a digital content, the terminal system being provided with means for reading information from the storage medium and writing information into the storage medium, first processing means for reading a code from a predetermined storage location of the storage medium to judge whether or not the storage location is in a read only storage area of the storage means and to judge whether or not the code string is a predetermined code, second processing means for reading, when the storage location and the code are valid, a digital content from a rewritable storage area of the storage medium for program execution or data reference, and third processing means for requesting the distributor to transmit the latest edition of the digital content and storing the acquired latest edition into the rewritable storage area of the storage medium, and the distributor being provided with processing means for transmitting the latest edition of the digital content to the terminal system in response to the request from the terminal system. With this system, since a storage medium, the whole of which is a read only storage area, cannot be subjected to the writing of the latest edition of a digital content when the digital content is version-improved, it is possible to restrict the use of an illegal copy on the storage medium. Also, even in the case where a digital content is illegally copied into a storage medium which includes a read only storage area and a rewritable storage area as in the storage medium of the present invention, it is possible to prevent the illegal acquisition of the digital content in such a manner that the distributor checks a user profile code such as a contract code, personal code, password or the like of a user of the digital content and the number of times of distribution when the distribution receives the request of the latest edition from the terminal system.

As mentioned above, a storage medium of the present invention can prevent the use of an illegal copy of a digital content. In the other words, it can be understood that the use of the digital content is restricted to a storage medium for which a contract for use of the digital content is concluded.

The number of predetermined codes stored in the read only storage area is not limited to one. A plurality of codes can be stored so that a code to be referred to for the certification of the storage medium is changed in accordance with a term of validity of the digital content. With the construction in which the plurality of codes are set, it is possible to provide a trial term for a digital content or to change a code to be checked in accordance with the term of validity.

Also, with a construction in which a user profile code used for the user certification when a user acquires the latest edition of a digital content is stored in a rewritable storage area of the storage medium of the present invention or in another memory so that it is automatically transmitted from a terminal system to a distributor, it is possible to save on labor and time for inputting the user profile code for the certification of a user. Namely, either in the case where an access is made to a digital content in the storage medium of the present invention or in the case where an access is made to a digital content possessed by the distributor, it is not necessary for the user to perform a specific operation for the certification. In other words, the possession of a dedicated storage medium acts, by itself, as the certification in the use of a digital content, thereby making it possible to save that labor and time for the certification for each access. With a construction in which a user profile code is registered into the distributor side or updated thereon in accordance with a request from the terminal system to the distributor, a user himself or herself can set and register at least a part (for example, a password) of the profile code and can change into the distribution side at least a part of the profile code in accordance with a security environment.

A system using a digital content is not limited to the terminal system which is connected to the distributor through the network. Instead of acquiring the latest edition of the digital content through the network, there can be used a distribution relay system with which the updating of the digital content using a removable storage medium is possible. Such a distribution relay system reads a code from a predetermined storage location of the storage medium to judge whether or not the storage location is in a read only storage area of the storage medium and to judge whether or not the code matches with a predetermined code. When the storage location and the code are valid, the distributor relay system reads a digital content from a memory and stores the read digital content into a rewritable storage area of the storage medium. The storage medium having the latest edition of the digital content thus stored therein can be used by a user through a storage medium reading unit of an information processor (or computer).

A function required for the information processor includes at least the storage medium reading unit, processing means for reading a code from a predetermined storage location of the storage medium to judge whether or not the storage location is in a read only storage area of the storage medium and to judge whether or not the code is a predetermined code, and processing means for reading, when the storage location and the code are valid, a digital content from a rewritable storage area of the storage medium for program execution or data reference. Thereby, a small-size and low-cost system as an information processor using a digital content can be implemented.

In the present invention, the term of validity of a digital content can be set in the read only storage area of the storage medium. The information processor reads this term of validity to check whether or not the present date is included in the term of validity. Namely, the purchase of the storage medium ensures the acquisition of the latest edition of the digital content to the user for a fixed term of validity.

According to the present invention, since the check of whether or not a storage medium is valid is made using a storage medium composed of a read only storage area and a rewritable storage area as mentioned above, it is possible to prevent the use of an illegal copy of a digital content. Also, the present invention provides a digital content distribution system in which the purchase of a storage medium materializes a contract for use and the latest edition of a digital content can thereafter be acquired expediently by use of the same storage medium. Further, the present invention makes it possible to easily acquire the latest edition of a digital content from a distribution center through a network or from a distribution relay system through the storage medium.

DESCRIPTION OF THE PREFERRED EMBODIMENTS

Embodiments of the present invention will now be described referring to the accompanying drawings.

Figure 1:
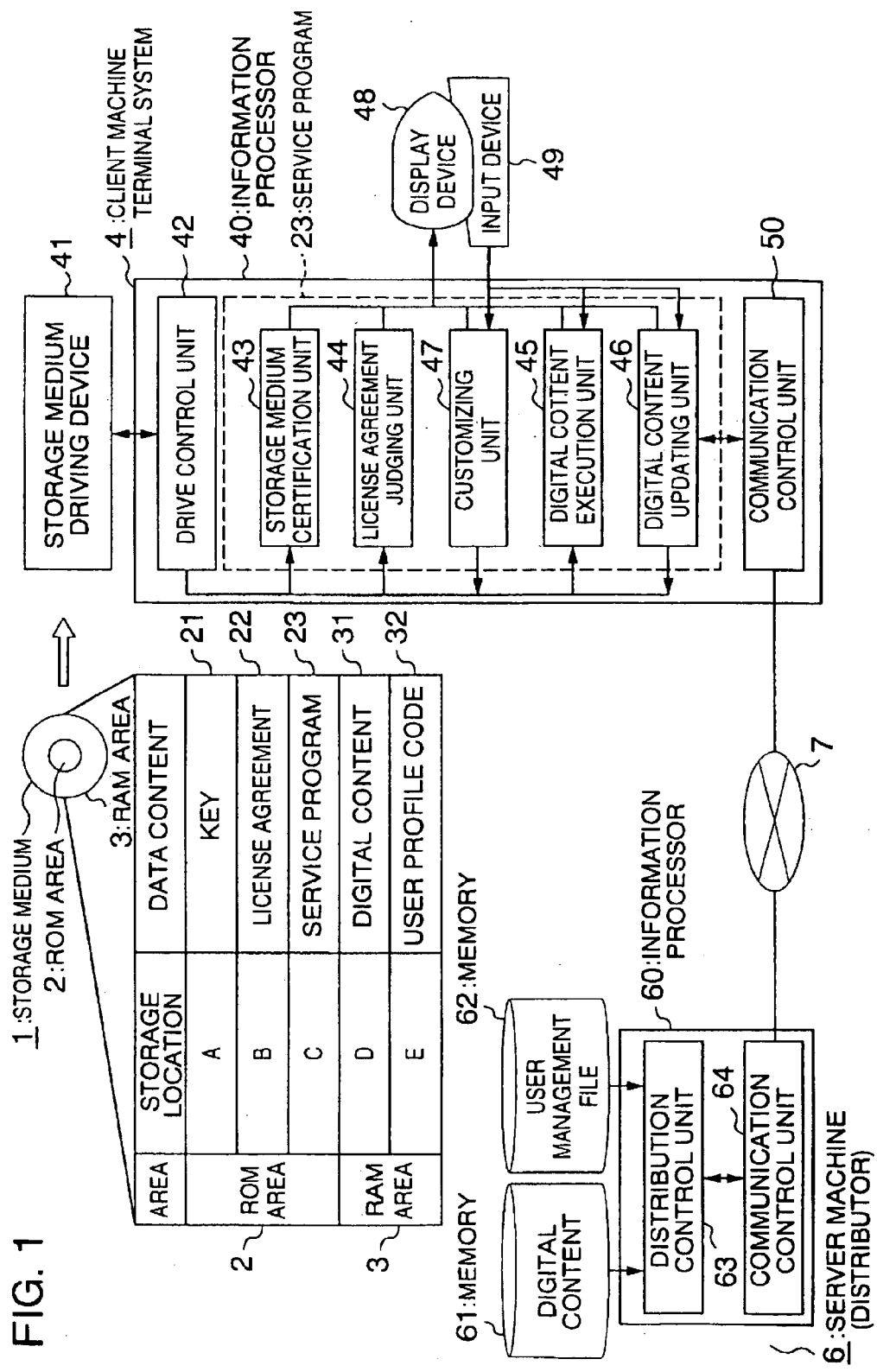
FIG. 1 is a block diagram of a digital content distribution system according to a first embodiment of the present invention.

FIG. 1 is a block diagram of a digital content distribution system according to a first embodiment of the present invention. A removal storage medium 1 for distribution of a digital content includes a mixed structure of a ROM area 2 and a RAM area 3. The ROM area 2 is a read only storage area and can be recorded with data at a low cost through a stamping method in which unevenness is applied to a storage medium in a manner similar to that in the case of CD-ROM. The recording may be performed through another method. The RAM area 3 is a rewritable storage area. In the shown example, data can be rewritten many times.

The ROM area 2 includes a key 21, a license agreement 22 and a service program 23 which are stored at predetermined storage locations A, B and C, respectively. The key 21 is a specified code string for keyword matching or hash function matching. The key 21 is used for certificating or authenticating the decoding of data stored at a predetermined storage location of the RAM 3. The license agreement 22 is set with use conditions such as a term of validity of a digital content from a server machine (or distributor) 6. The license agreement 22 is used for license agreement checking. If there is no limitation, the license agreement 22 is unnecessary. The service program 23 is a program for performing a support for the use of the digital content. A memory card or an IC card having an enormous amount of memory addresses can be used in place of the storage medium.

The RAM area 3 includes predetermined storage locations (or memory addresses) D and E where a digital content 31 and a user profile code 32 are stored, respectively. The digital content 31 is a body of an encrypted encoded digital content. The user profile code 32 is information such as user identification information concerning personal information of a user. The user profile code 32 is used for security checking and customizing. If the user identification is not made, the user profile code 32 is unnecessary.

A client machine (or terminal system) 4 for using a digital content is composed of an information processor 40 (which may include a personal computer, work station or the like), a storage medium drive system 41, a display device 48 and an input device 49 such as a mouse, keyboard, electronic pen or the like. The storage medium drive system 41 is connected to the information processor 40 so that when the storage medium 1 is mounted to the storage medium drive system 41, the reading of information from the storage medium 1 and the writing of information into the RAM area 3 are performed. The display device 48 is connected to the information processor 40 for providing an input display screen for the input of commands and a display screen for the output of a digital content. The input device 49 is connected to the information processor 40 for inputting commands and data. The information processor 40 includes an operation processing unit and a memory which are not shown and a drive control unit 42 and a communication control unit 50 which are shown. The service program 23 is a group of programs which are read from the storage medium 1, stored in the memory of the information processor 40 and executed by the operation processing unit thereof. The drive control unit 42 is a hardware and a program for controlling the input and output of information between the storage medium drive system 41 and the service program 23. The communication control unit 50 is connected to the digital content distributing server machine 6 through a network 7. The communication control unit 50 is a hardware and a program for controlling the transmission and reception of information between the server machine 6 and the information processor 40.

The service program 23 includes a storage medium certification unit 43, a license agreement judging unit 44, a digital content execution unit 45, a digital content updating unit 46 and a customizing unit 47. The storage medium certification unit 43 is a processing block which judges whether or not the key 21 exists in the ROM area 2 of the storage medium 1 and has a correct code. The license agreement judging unit 44 is a processing block which judges whether or not the present use environment matches with the license agreement 22. The digital content execution unit 45 is a processing block which fetches the digital content 31 from the RAM area 3 of the storage medium 1 and decodes the digital content to execute it. A command to execute the digital content 31 is inputted from the input device 49 and the result of execution is displayed on the display device 48. The digital content updating unit 46 is a processing block which makes a request for the latest edition (or version) of a digital content to the server machine 6 through the communication control unit 50 and the network 7 in accordance with a command from the input device 49 and stores the acquired digital content 31 into the RAM area 3. The customizing unit 47 is a processing block which performs the input of data into the user profile code field 32 of the RAM area 3 and the updating of data in the user profile code field 32 in accordance with a command and data inputted from the input device 49.

The server machine (or distributor) 6 installed at a distribution center for distributing a digital content is composed of an information processor 60 which may include a personal computer, work station or the like, a memory 61 which is connected to the information processor 60 and stores the latest edition of a digital content, and a memory 62 which is connected to the information processor 60 and stores a user management file. The information processor 60 includes an operation processing unit, a memory and a file control unit which are not shown and a distribution control unit 63 and a communication control unit 64. The distribution control unit 63 is a program which is stored in the memory (not shown) of the information processor 60 and is executed by the operation processing unit (not shown) thereof. The communication control unit 64 is connected to the client machine 4 through the network 7. The communication control unit 64 is a hardware and a program for controlling the transmission and reception of information between the client machine 4 and the information processor 60. When a request for a digital content from the client machine 4 is received through the network 7 and the communication control unit 64, the distribution control unit 63 refers to the user management file in the memory 62 through the file control unit (not shown) to check a personal code (hereinafter referred to as a profile code) such as a contract code, password or the like received from the client machine 4 and the number of times of distribution of the digital content. If the profile code is valid, the encoded digital content stored in the memory 61 is transmitted to the client machine 4 through the file control unit.

The maker of a storage medium 1 fabricates a storage medium 1 in which a key 21, a license agreement 22 and a service program 23 are stored in a ROM area 2. The latest edition of a digital content may be stored in a digital content field 31 of a RAM area 3. Alternatively, the digital content field 31 may be only ensured with no information stored therein. If the digital content 31 is not stored in the RAM area at an initial state while the distribution center distributes it to the client machine 4, the time and cost for writing information into the RAM area 3 can be saved. Similarly, a user profile code field 32 of the RAM area 3 is stored with a profile code of a contracting user or the field is only ensured with no information stored therein. In any case, the user purchases the thus fabricated storage medium 1 through a selling shop or a mail order sale. The purchase of the storage medium 1 by the user materializes the conclusion of a contract for use of the corresponding digital content. Especially, in the case of a digital, content the latest edition of which is periodically issued as in a digital newspaper, it is preferable that in order to prevent an illegal copy of the digital content from being distributed, a user profile code for user identification is settled between a storage medium selling trader and the user at the time of conclusion of the use contract. The selling trader or the like registers the settled user profile code into the user management file of the server machine 6 through his or her terminal machine (not shown). The user makes a request for the latest edition of the digital content to the server machine 6 by use of this user profile code.

Figure 2:
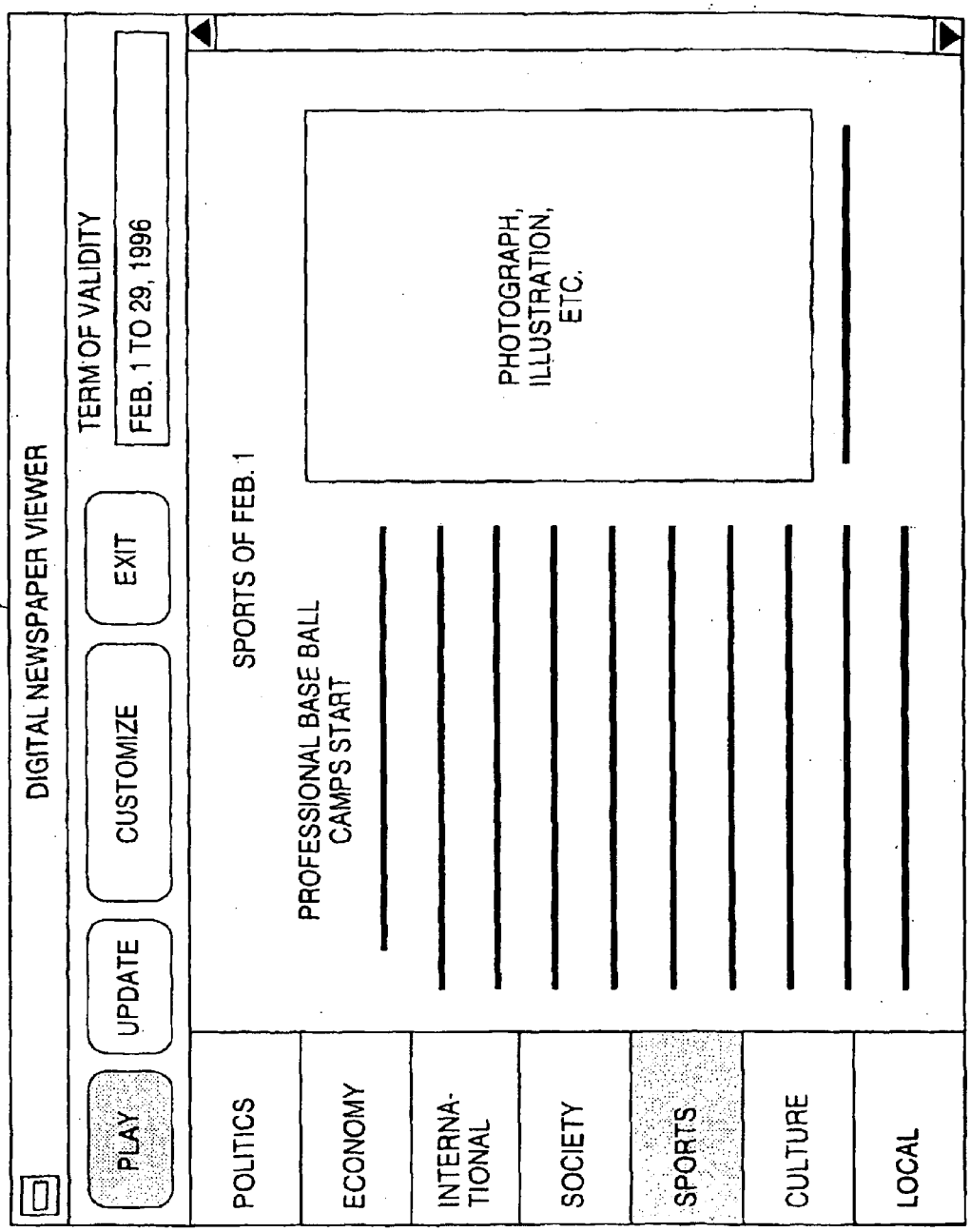
FIG. 2 is a diagram showing an example of a graphical user interface for a service program in the embodiment.

FIG. 2 is a diagram showing an example of a graphical user interface for the service program 23 displayed on the display device 48. "DIGITAL NEWSPAPER VIEWER" 27 is the name of a program under execution. "PLAY", "UPDATE" and "CUSTOMIZE" are buttons for selecting corresponding processes. "EXIT" is a button for designating the completion of a process of the service program 23. "TERM OF VALIDITY" indicates the license agreement condition of the corresponding digital content. "POLITICS", "ECONOMY",—indicate the genres of news in the digital newspaper. A text and a photograph, illustration, etc. of the selected genre are displayed on a display area for the digital newspaper.

Figure 3:
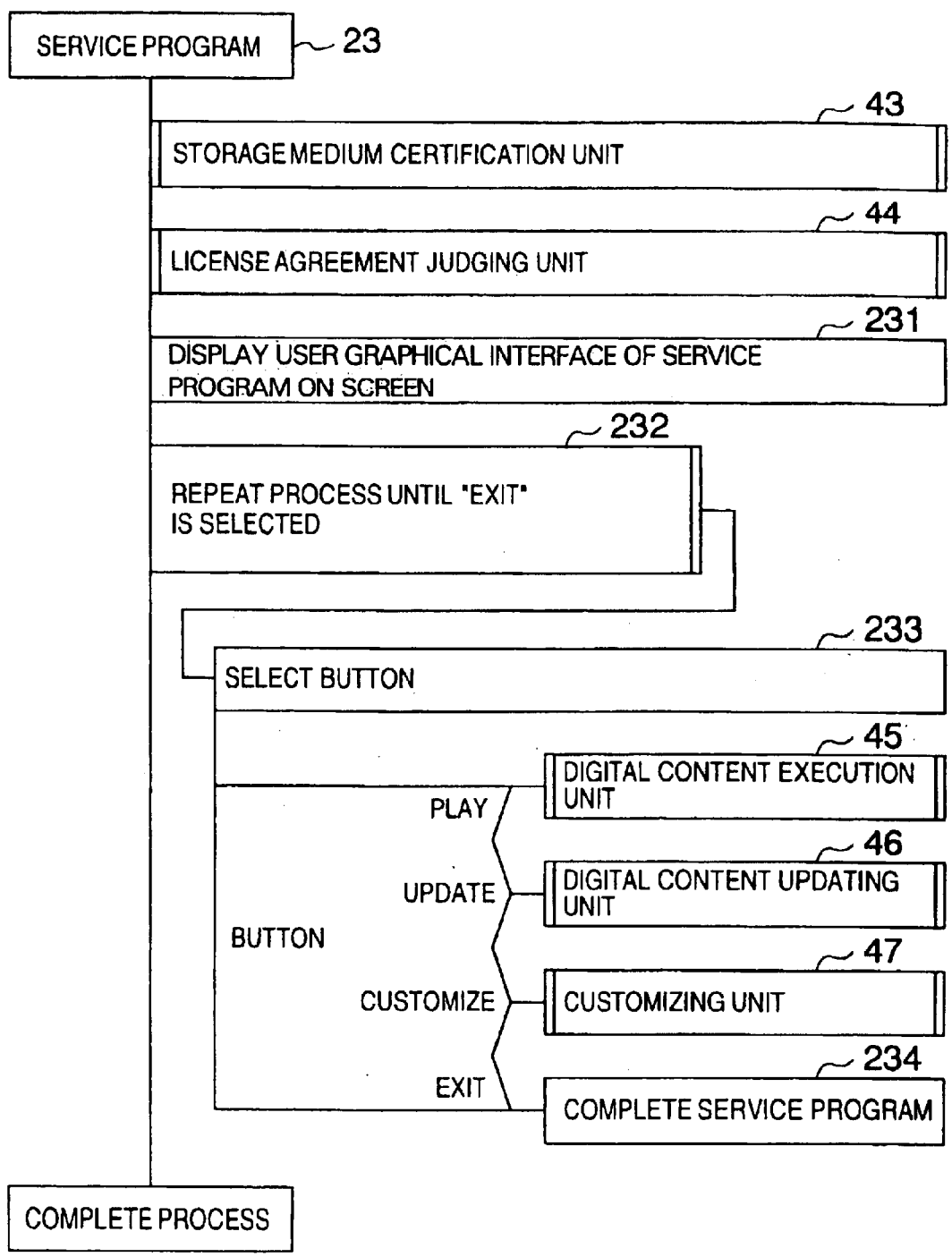
FIG. 3 is a flow chart of a process performed by the service program in the embodiment.

FIG. 3 is a flow chart of a process performed by the service program 23. When the storage medium 1 is mounted to the storage medium driver 41 and the storage medium 1 is driven, the service program 23 stored in the storage medium 1 is loaded to the memory (not shown) of the information processor 40 through the drive control unit 42. A storage medium certification unit or block 43 first entrusted with a control is executed and a license agreement judging block 44 is thereafter executed. When the checks of the storage medium certification unit 43 and the license agreement judging unit 44 are passed, a service program graphical user interface is displayed on the display device 48 (step 231). Next, a process selected by a button is repeated until the "EXIT" button is selected (steps 232 and 233). When the "PLAY" button is selected through the input device 49, a digital content execution block 45 is executed in order to decode and display the digital content. When the "UPDATE" button is selected, a digital content updating block 46 is executed in order that the digital content is inputted from the server machine 6 and is stored into the RAM area (or the contents of the RAM area are updated). When the "CUSTOMIZE" button is selected, a customizing block 47 is selected. When the "EXIT" button is selected, the process by the service program 23 is completed (step 234).

Figure 4:
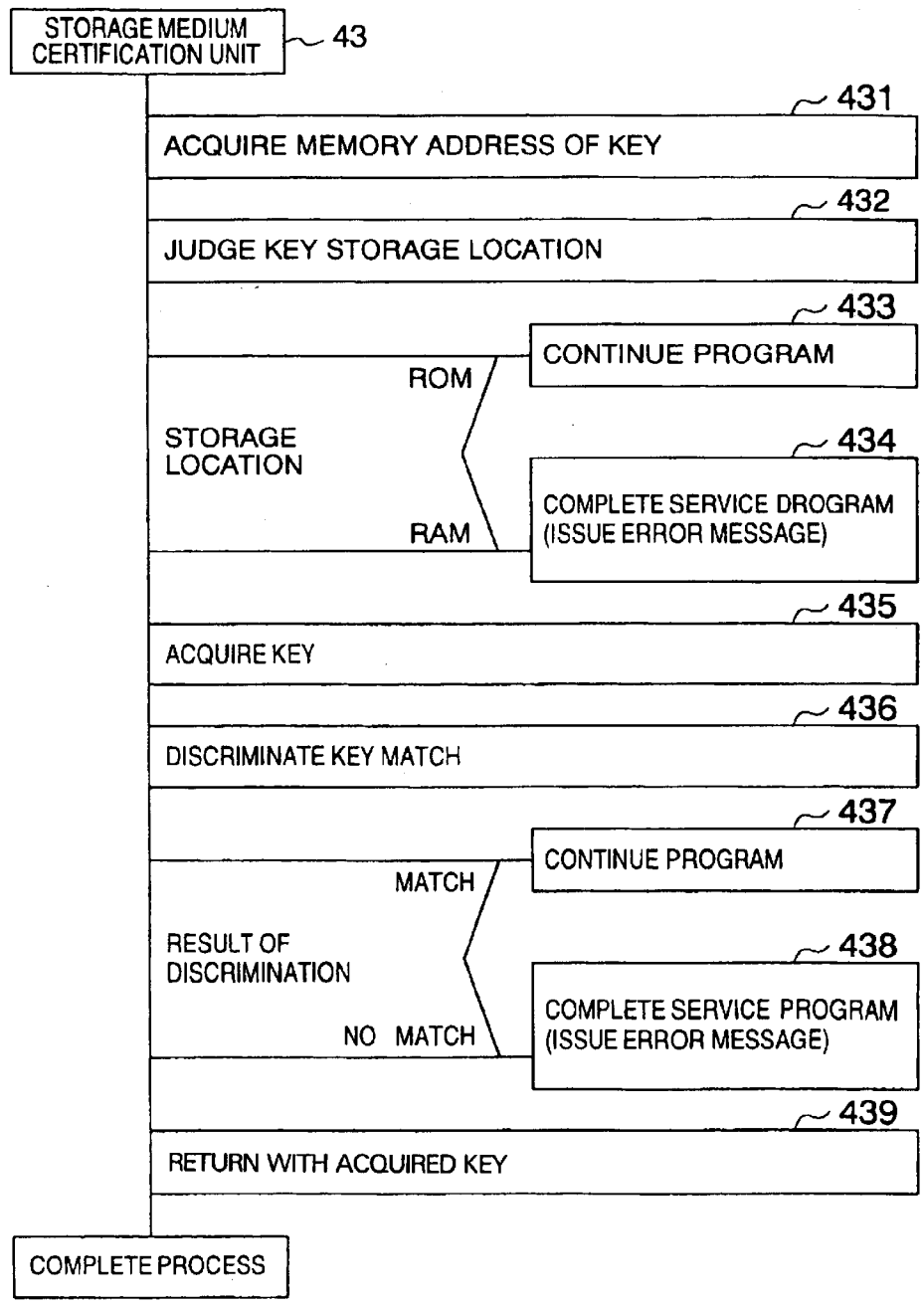
FIG. 4 is a flow chart showing a process performed by a storage medium certification unit in the embodiment.

FIG. 4 is a flow chart showing a process performed by the storage medium certification unit 43. The storage medium certification unit 43 acquires a storage location (or memory address) A of a key 21 from the digital content 31 or the program 23 (step 431) and makes an access to the storage location A of the storage medium 1 through the drive control unit 42 and the storage medium driver 41 to judge the type of an area of the storage location (step 432). The storage location A and the key 21 are attached to the digital content 31, distributed to the client machine 4, and stored in the RAM area 3. Alternatively, the service program 23 obtains the storage location A and the key 21. If the storage location exists in a ROM area 2, the execution of the program is continued (step 433). If the storage location exists in a RAM area 3, an error message indicating an error is displayed on the display device 48 (step 434). In this case, it is not possible to continue the process of the service program 23. In order to know whether the storage location exists in the ROM area or the RAM area, there is utilized a fact that a signal level obtained by converting the intensity of reflected light from the storage location A into an electric signal is different between the ROM area 2 and the RAM area 3. That is, the area of the storage location is determined on the basis of a difference in signal level so that a flag of "1" or "0" is set. The drive control unit 42 makes the judgement of the existence of the storage location A in the ROM area 2 or the RAM area 3 in accordance with the set flag and informs the storage medium certification unit 43 of the result of judgement. If the storage location is in the ROM area, the continuation of the program is possible. The storage medium certification unit 43 fetches the key 21 from the storage location A (step 435) and discriminates the key through the comparison with a key attached to the digital content 31 or embedded in the program 23 (step 436). In the case where it is determined through a keyword or hash function matching or the like that a predetermined relation is satisfied between both the keys or a matching between both the keys is obtained, the process is continued (step 437). When the digital content 31 is a program of an amusement game or a business program to be executed in the terminal system 4, it is allowed to run the program after the comparision has matched. In the case where no matching is obtained, an error message is displayed on the display device 48 (step 438). In this case, it is not possible to continue the process of the service program 23. A plurality of different keys 21 may be stored in the ROM area 2 so that a key made the object of discrimination can be changed in accordance with the term of validity of the storage medium 1, for example, in accordance with whether the storage medium 1 is a trial edition or an authentic edition. Finally, the storage medium certification unit 43 returns to the service program 23 with the acquired key (step 439). In order to enhance an illegality removing ability by periodically changing the key, the server machine 6 can easily make a periodic change of the memory address A.

Figure 5:
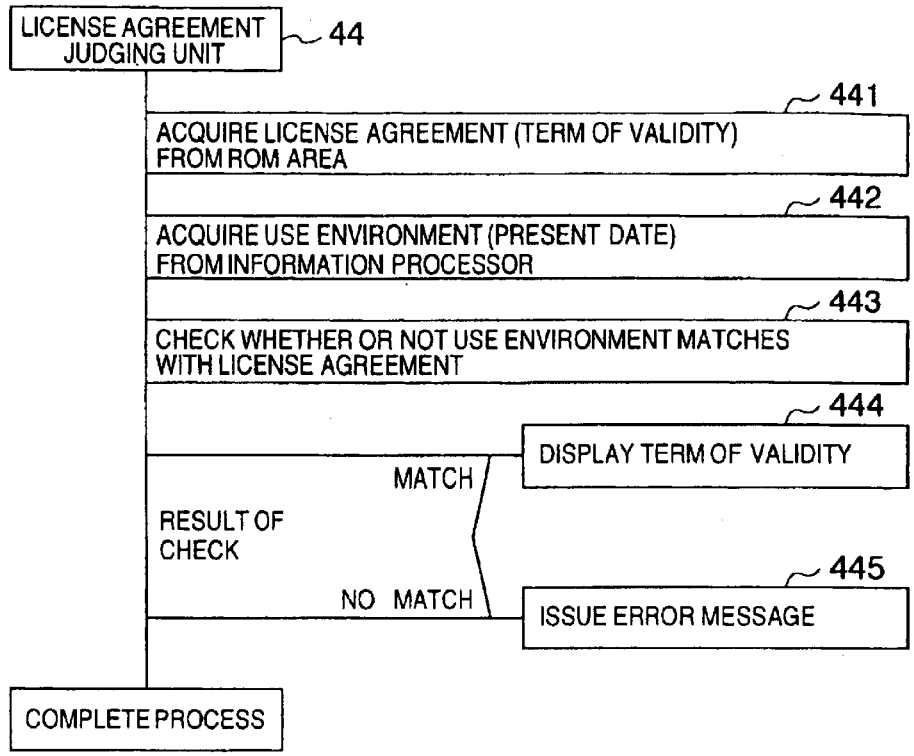
FIG. 5 is a flow chart showing a process performed by a license agreement judging unit in the embodiment.

FIG. 5 is a flow chart showing a process performed by the license agreement judging unit 44. The license agreement judging unit 44 acquires a license agreement 22 from the storage location B of the ROM area 2 (step 441). The license agreement 22 includes a term of validity. Next, the license agreement judging unit 44 acquires the present date from the information processor 40 through an operating system (not shown) (step 442) and checks whether or not the present date is included in the license agreement 22 or term of validity (step 443). In the case where the present date matches with the license agreement 22, the term of validity is displayed on the service program graphical user interface (step 444). In the case where the present date does not match with the license agreement 22, an error message is displayed on the display device 48 (step 445).

Figure 6:
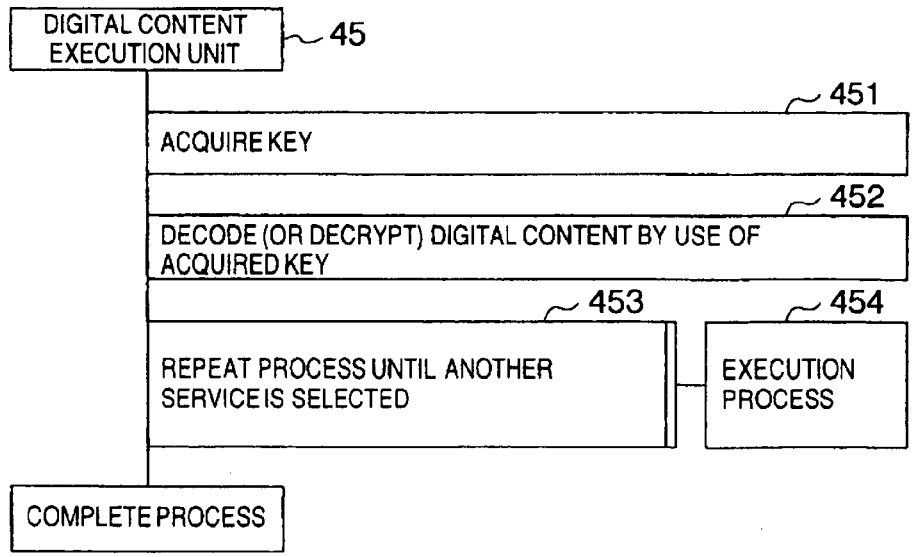
FIG. 6 is a flow chart showing a process performed by a digital content execution unit in the embodiment.

FIG. 6 is a flow chart showing a process performed by the digital content execution unit 45. The digital content execution unit 45 receives the key 21 acquired from the service program 23 (step 451) and fetches a digital content 31 from the storage location D of the RAM area 3 to decode or decrypt it by use of the key 21 (step 452). The key for decryption of the digital content 31 and the key for judgement of the storage area may be provided separately from each other so that they are taken out of different storage locations. In this case, the key for judgement of the storage area may be used to acquire the key for description. In the case where the digital content is not encrypted, the digital content execution unit 45 teaches a digital content 31 from the storage location D and just decodes the content 31 without the key 21. In the case where the digital content is not stored at the storage location D, an error message is displayed on the display device 48. Next, the digital content execution process is performed until another service is selected (steps 453 and 454). In the case where the digital content 31 is an execution type of program, the digital content execution unit 45 starts this program as it is. In the case where the digital content 31 is data such as a digital newspaper, the digital content execution unit 45 activates a viewer to display the data. The viewer may be possessed as a part of the service program 23 in the ROM area 2 or the digital content 31 may have both the viewer and the data. When a (book) marker indicating a user's reference location in the digital newspaper is set in the storage location E of the RAM area 3, the digital content execution unit 45 displays, on the display device 48, a page corresponding to a page number of the digital content for which the marker is set (customizing process). The marker will be referred to later in conjunction with the explanation of the customizing unit 47.

Though the digital content execution unit 45 executes the digital content 31 after the loading of the digital content 31 from the RAM area 3 of the storage medium 1 and the decoding or decryption of the digital content 31, the decoded or decrypted program or data may be stored in the RAM area 3 or may be developed on a high-speed memory such as a hard disk or semiconductor memory connected to the information processor 40. This is a matter of design determined for each digital content 31 in consideration of the utility value of the digital content when the digital content on the hard disk or semiconductor memory is copied, and in consideration of the execution performance of the digital content. Also, it is not necessarily required that the whole of the digital content 31 be encrypted. The extent to which the encryption is made is determined by the balance of a processing performance or ability at the time of decryption with the utility value of an illegal copy, and hence it is a matter of design. It is noted there might be a case that no encryption is made to the digital content.

It is preferable that the user profile code is formed in the combination of a contract code or a number characteristic of the medium hereinafter, the specific medium number) which is determined upon purchase of the storage medium 1 and a password which is set by a user of the storage medium 1 and is known by only the user. A storage medium selling trader or the like registers the determined specific medium number into the user management file of the server machine 6 through a dedicated terminal equipment (not shown). In the case where information is recorded in a read only storage area of the storage medium 1 through a stamping process, it is not possible to record the specific medium number in the storage medium 1 beforehand. Therefore, the specific medium number is recorded, for example, on a jacket of the storage medium 1 and the user stores this specific medium number (together with a password set by himself or herself) into the user profile code field 32 of the storage medium 1. Further personal information of the user may be stored in addition to the password. It is preferable that the certification of the user in updating the digital content 31 is performed on the basis of a profile code composed of at least the specific medium number and the password.

The user management file in the memory 62 includes records of information concerning the respective users. Each record is composed of personal information which includes a specific medium number, a password, the residence, name and mail address of the user, and so forth, and a data item which includes the number of times of distribution. Though the record is formed when a selling trader or the like registers the specific medium number, the password and the other personal information is blanked and the cumulative number of times of distribution is set to 0.

Figure 7:
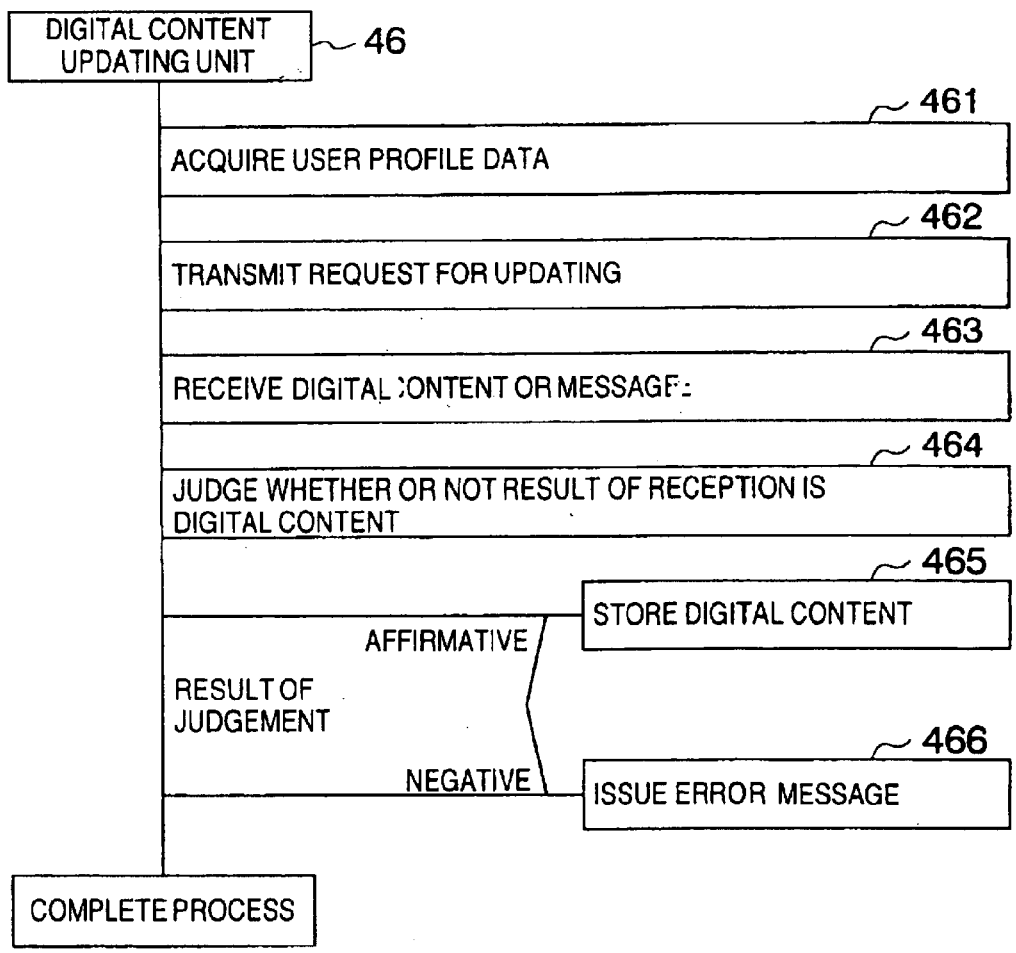
FIG. 7 is a flow chart showing a process performed by a digital content updating unit in the embodiment.

FIG. 7 is a flow chart showing a process performed by the digital content updating unit 46. The digital content updating unit 46 fetches the user profile code 32 from the storage location E of the RAM area 3 (step 461) and transmits the title of a desired digital content and the user profile code to the server machine 6 through the communication unit 50 and the network 7 (step 462). When the latest edition of the digital content or a message is received from the server machine 6 (step 463), the judgement is made of whether the result of reception is a digital content or an error message (step 464). In the case where the result of reception is a digital content, the received digital content is stored into a storage location D of the RAM 3 (step 465). In the case where the result of reception is an error message, the error message is displayed on the display device 48 (step 466).

Figure 8:
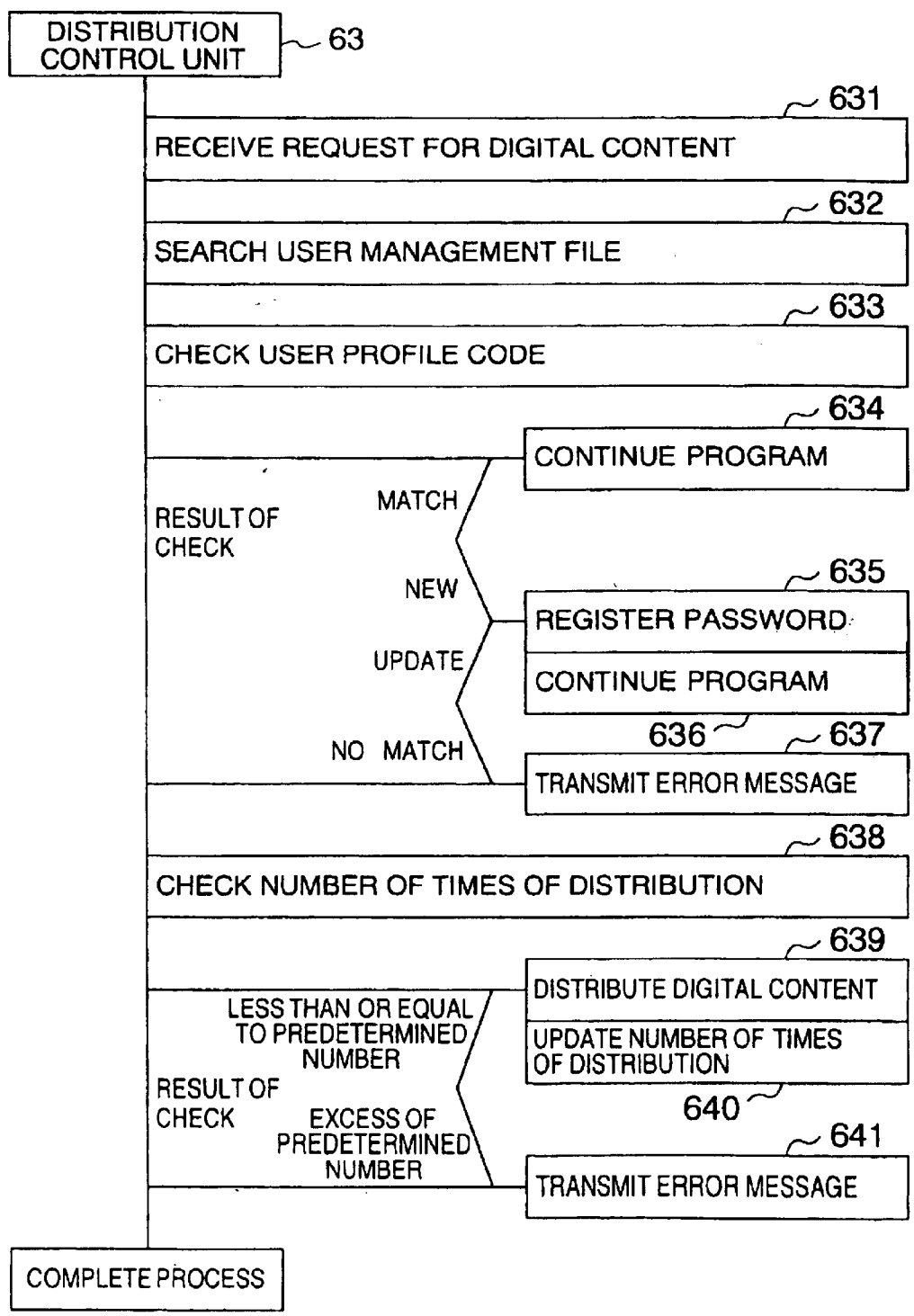
FIG. 8 is a flow chart showing a process performed by a distribution control unit in the embodiment.

FIG. 8 is a flow chart showing a process performed by the distribution control unit 63 of the server machine 6. When a request for a digital content is received from the client machine 4 through the network 7 and the communication control unit 64 (step 631), the distribution control unit 63 searches the user management file in the memory 62 for a specific medium number registered concerning the requested digital content (step 632). And, the distribution control unit 63 checks whether or not the specific medium number is registered. If the specific medium number is registered, the check is made of whether or not a password of the requester matches with a password registered corresponding to the registered specific medium number (step 633). In the case where the specific medium number and the password of the requester match with those which are registered, the execution of the program is continued (step 634). In the case where the specific medium number of the requester is registered but the password thereof is not registered, the password and the other personal information received corresponding to the specific medium number are registered into the user management file with the received request being regarded as being the first request for a digital content (step 635) and the execution of the program is continued (step 636). In the case where the specific medium number and the password of the requester match with those which are registered and a request for the updating of the password and a password after updating are added, the password is registered again by updating (step 635) and the execution of the program is continued (step 636). In the case where the specific medium number of the requester is not registered, the case where the matching of the corresponding pass-word is not obtained (except for the case of a new request for a digital content), or the case where the designation of a password to be registered is made in a new request for a digital content, an error message is transmitted to the client machine 4 (step 637). Next, the distribution control unit 63 checks whether or not the number of times of distribution reaches a predetermined number (step 638). When the cumulative number of times of distribution is less than or equal to the predetermined number, the distribution control unit 63 fetches the digital-content from the memory 61 and transmits it to the client machine 4 through the communication control unit 64 and the network 7 (step 639). Next, the cumulative number of times of distribution for the requester in the user management file is updated by adding 1 (step 640). When the cumulative number of times of distribution is larger then the predetermined number, an error message is transmitted to the client machine 4 (step 641).

In the case where there is a fear that a user profile code transmitted from the client machine 4 is subjected to tapping (by a pirate listener), it is preferable that the password is periodically updated. When a specific medium number and the corresponding password transmitted from the client machine 4 match with those which are registered, the distribution control unit 63 updates the old password by a new password. Also, when illegal access including the matching of a specific medium number but including no matching of a password is continuously detected several times, it is preferable that the distribution control unit 63 refers to a mail address in the corresponding personal information and transmits a mail calling attention to, for example, a change in pass-word.

Figure 9:
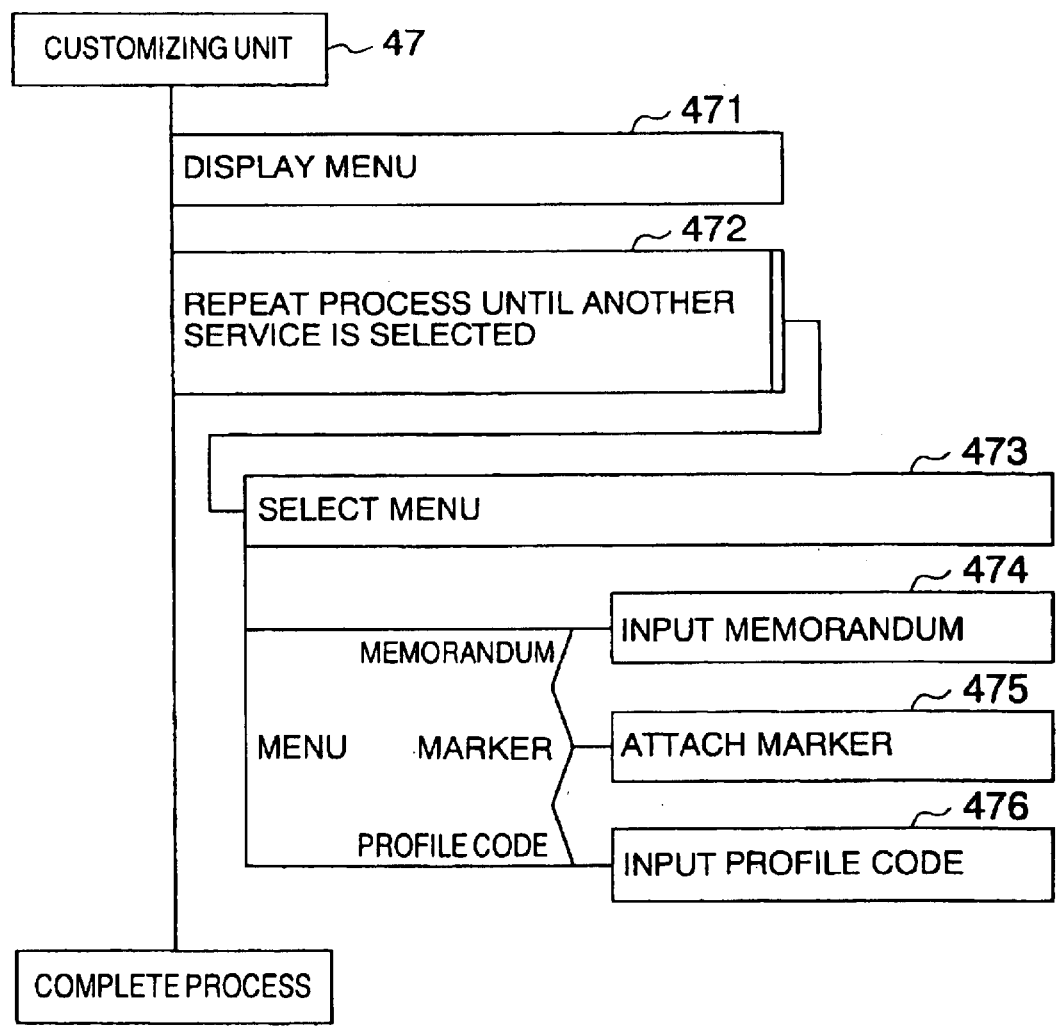
FIG. 9 is a flow chart showing a process performed by a customizing unit in the embodiment.

FIG. 9 is a flow chart showing a process performed by the customizing unit 47. The customizing unit 47 displays a menu for the above-mentioned customizing process in the display area on the service program operating display screen (step 471). When a process in the menu is selected (step 473), the process is changed over thereby. In the case where "MEMORANDUM" is selected, the input of a memorandum is permitted and the inputted memorandum is stored into the storage location E of the RAM area 3 (step 474). In the case where "MARKER" is selected, the page number of a page of a digital content being referred to is stored into the storage location E (step 475). In the case where "PROFILE CODE" is selected, an inputted profile code is stored into the storage location E of the RAM area 3 (step 476). Personal data including a profile code, the other personal data, a request for the updating of a password, and so forth which are transmitted from the client machine 4 to the server machine 6 are all stored in the storage location E and updated. And, they are used, as a message transmitted to the server machine 6, as they are.

In the first embodiment mentioned above, the user profile data 32 is set in the RAM area 3. However, it is possible to prepare a portion of the storage medium except for the key area of a write once read many type so that a selling trader writes a specific medium number into the ROM area 2 when the selling trader concludes a contract for use with a user. In this case, the customizing unit 47 stores a password and the other personal data into the user profile code field 32, and the digital content updating unit 46 fetches the specific medium number from the ROM area 2 and transmits the specific medium number to the server machine 6 as a profile code formed together with the pass-word and the other personal data in the user profile code field 32. The digital content 31 and the user profile code 32 can be written until the medium has no blank area.

According to the first embodiment, the storage medium certification unit 43 checks the existence of a key 21 in the ROM area 2 of the storage medium 1. Therefore, in the case where the storage medium 1 is illegally copied to a medium, the whole of which is rewritable, it is not possible to decode or execute a digital content 31 on the basis of the illegal medium. Also, in the case where the storage medium 1 is illegally copied to a medium, the whole of which is of a read only type (that is, not rewritable), it is not possible to write a version-up (or version-improved) digital content 31 into the illegal medium since a storage location of the digital content 31 is defined beforehand as D. This can restrict the use of an illegal practical version. With a construction in which a key other than the key 21 is set in the RAM area 3 and the existence of the other key is checked, the read only storage medium can be eliminated irrespective of version-up. Also, in the case where the storage medium 1 is illegally copied to a medium out of the contract which has the same construction including a ROM area 2 and a RAM, area 3, no matching with a password registered in the server machine 6 is found or a conflict with the restriction concerning the number of times of distribution occurs. Therefore, the latest edition of the digital content 31 cannot be acquired or only the copy up to the predetermined number of times of distribution is possible. Thereby, it is possible to restrict the use of an illegal practical version. Further, since a digital content transmitted from the server machine 6 to the client machine 4 through the network 7 is encrypted, a tapping through the network 7 is not effective. Also, since the distribution control unit 63 checks a profile code of a user of a digital content and the number of times of distribution, it is possible to prevent a person out of the contract from illegally acquiring a copy of the digital content or to prevent a contracting user from illegally distributing a copy of the digital content.

A system using only a specific medium number as a profile code and using neither password nor other personal data is also possible. In this case, the level of security supported by the system is lowered but a back-up is possible in an operational respect.

Figure 10:
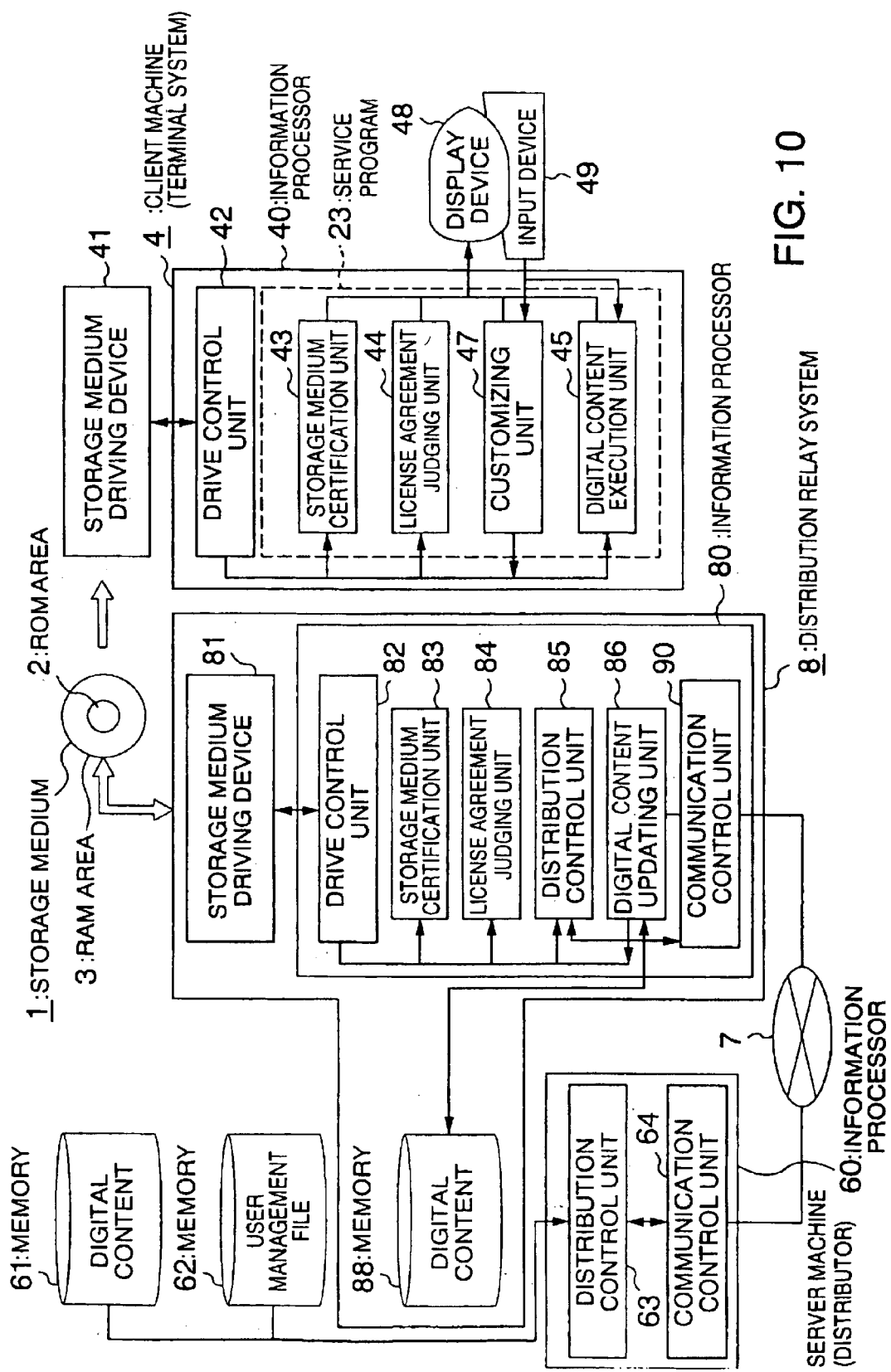
FIG. 10 is a block diagram of a digital content distribution system according to a second embodiment of the present invention.

FIG. 10 is a block diagram of a digital content distribution system according to a second embodiment of the present invention. The construction of a ROM area 2 and a RAM area 3 in a storage medium 1 is the same as that in the first embodiment. The construction and function of each of a storage medium driver 41, a drive control unit 42, a storage medium certification unit 43, a license agreement judging unit 44, a digital content execution unit 45, a customizing unit 47, a display device 48 and an input device 49 in a client machine (or terminal system) 4 are the same as those of the first embodiment. However, the digital updating unit 46 and the communication control unit 50 in the first embodiment are not provided in the portable terminal system of the present embodiment.

A distribution relay system or an information kiosk system 8 installed at a kiosk, book-stand, news-stand or the like for distributing a digital content includes an information processor 80, a storage medium drive system 81, and a memory 88 for storing a digital content of the latest edition. The storage medium driver 81 is connected to the information processor 80 so that when the storage medium 1 is mounted to the storage medium driver 81, the reading of information from the storage medium 1 and the writing of information into the RAM area 3 are performed. The information processor 80 includes an operation processing unit and a memory which are not shown, and a drive control unit 82 and a communication control unit 90 which are shown. A storage medium certification unit 83, a license agreement judging unit 84, a distribution control unit 85 and a digital content updating unit 86 are a group of programs which are stored in the memory of the information processor 80 and are executed by the operation processing unit thereof. The drive control unit 82 is realized by a hardware and a program which control the input and output of information between the storage medium drive system 81 and each of the storage medium certification unit 83, the license agreement judging unit 84, the distribution control unit 85 and the digital content updating unit 86. The communication control unit 90 is connected through a network 7 to a server machine (or distributor) 6 which is installed at a digital content distributing center. The communication control unit 90 is realized by a hardware and a program which control the transmission and reception of information between the server machine 6 and the information processor 80. Though not shown, a display device and an input device such as a touch panel, keyboard or the like are connected to the information processor 80 to enable the communication with a user through a user interface unit (not shown).

The storage medium certification unit 83 is a processing block which performs the same process as that performed by the storage medium certification unit 43. The license agreement judging unit 84 is a processing block which performs the same process as that performed by the license agreement judging unit 44. The distribution control unit 85 is a processing block which reads a user profile code stored in the user profile code field 32 of the RAM area 3 of the storage medium 1 and sends it to a distribution control unit 63' of the server machine 6 to check the validity of the user profile code and the number of times of distribution of a digital content. The digital content updating unit 86 is a processing block which stores a digital content from the server machine 6 into the memory 88 and updates a digital content in the storage medium 1 by the digital content in the memory 88.

When a request for a digital content is received from the distribution relay system 8 through the network 7 and a communication control unit 64, the distribution control unit 63' of the server machine 6 refers to a user management file in a memory 62 to check a profile code of a requesting user and the number of times of distribution, and transmits a digital content copy permitting message to the distribution relay system 8 in the case where the profile code and the number of times of distribution are valid. A process performed by the distribution control unit 63' upon reception of a request for a digital content from a user of the storage medium 1 is the same as the processing operation of the distribution control unit 63 (in the first embodiment), except for the distribution of a digital content in step 639 (see FIG. 8). In step 639, the distribution control unit 63' transmits a message permitting the copy instead of distributing a digital content.

Each time the latest edition of a digital content is issued, the digital content updating unit 86 of the distribution relay system 8 transmits a request message for the digital content to the server machine 6 through the communication control unit 90 and the network 7. The distribution control unit 63' of the server machine 6 receiving this request through the communication control unit 64 performs the certification of the distribution relay system 8 and thereafter reads a digital content stored in a memory 61 to transmit it to the distribution relay system 8. The digital content updating unit 86 stores the received digital content into the memory 88. In a manner similar to that in the first embodiment, the storage medium certification unit 83, when a storage medium 1 subjected to a contract for use is mounted on the storage medium driver 81, makes an access to a key field 21 of the storage medium 1 through the storage medium driver 81 and the drive control unit 82 to judge whether or not the key 21 exists in a ROM area 2 of the storage medium 1 and has a correct code or string. It is possible to know whether the key 21 is in a ROM area by modifying the key 21, writing it at the same address and again accessing and judging whether it still has the correct code. After the certification of the key by the storage medium certification unit 83 is completed, the license agreement judging unit 84 makes an access to a license agreement field 22 to judge whether or not the present use environment matches with the license agreement 22. After the check of the use environment by the license agreement judging unit 84, the distribution control unit 85 reads a user profile code in a user profile code field 32 and sends it to the distribution control unit 63' of the server machine 6. When a message permitting the copy of the digital content is received from the distribution control unit 63' of the server machine 6, the control is transferred from the distribution control unit 85 to the digital content updating unit 86, which in turn reads the digital content from the memory 88 to store it into a RAM area 3 of the storage medium 1 through the drive control unit 82 and the storage medium driver 81.

When the latest edition of the digital content is thus stored in the storage medium 1, a user of the client machine 4 which is portable can use the digital content in a manner similar to that in the first embodiment after mounting the storage medium on the storage medium driver 41. The storage medium certification unit 43 and the license agreement judging unit 44 rejects the use of an illegally copied storage medium and the use of the storage medium 1 for which the term of validity has expired.

According to the second embodiment mentioned above, since the client machine 4 has not the digital content updating unit 46 and the communication control unit 50, the machine can be made low in cost and small in size. It is possible to prepare the ROM area 2 of a write once read many type so that a specific medium number is written into the ROM area 2. In this case, the distribution control unit 85 fetches the specific medium number from the ROM area 2 and transmits the specific medium number to the server machine 6 as a profile code formed together with a password and the other personal data in the user profile code field 32. Alternatively, the distribution control unit 85 fetches the specific medium number from the ROM area 2 and transmits the specific medium number as a profile data to the server machine 6 without using the password and the other personal data. If the customizing unit 47 does not write data into the user profile code field 32, the mere reading of information in the storage medium 1 suffices for the client machine 4, and hence a function of writing information from the storage medium driver 41 and the drive control unit 42 into the storage medium 1 can be eliminated. This contributes to the lowering of the cost of the client machine 4. The digital content stored in the memory 88 offers itself for a copy service to many storage mediums 1. Therefore, the number of copies of the digital content transmitted through the network 7 is reduced, thereby making it possible to reduce a load imposed on the network 7.

It is possible to apply the present invention to the distribution/management of electronic or digital money by regarding electronic money as being a digital content and regarding an electronic purse as being a storage medium.

What is claimed is:

1. A digital content protection system for reading a digital content from a server, determining whether a program is executable, and processing said digital content, comprising:
    a drive unit for making an access to information in a storage medium mounted thereto, the storage medium having a read only storage area and a rewritable storage area;
    a digital content access permitting section, including a judging section connected to said drive unit for reading a code from a predetermined location on said storage medium and judging whether or not said code matches with a predetermined code; and
    a control section for distinguishing whether said predetermined location exists in said read only storage area or in said rewritable storage area to determine that, when said code exists in said read only storage area, said program is executable,
    wherein information concerning said predetermined location is included at a predetermined position in said digital content, and said storage medium has a plurality of different keys at a plurality of predetermined locations on said read only storage area designated by said predetermined position.

2. A digital content protection system for reading a digital content from a server, determining whether a program is executable, and processing said digital content, comprising:
    a drive unit for making an access to information in a storage medium mounted thereto, the storage medium having a read only storage area and a rewritable storage area;
    a digital content access permitting section, including a judging section connected to said drive unit for reading a code from a predetermined location on said storage medium and judging whether or not said code matches with a predetermined code;
    a control section for distinguishing whether said predetermined location exists in said read only storage area or in said rewritable storage area to determine that, when said code exists in said read only storage area, said program is executable, and
    an execution section for controlling execution of said program in accordance with a result of said control section,
    wherein when said predetermined location exists in said rewritable storage area, said execution of said program is not permitted.

3. A digital content protection method for reading a digital content from a server, determining whether a program is executable, and processing said digital content, comprising the steps of:

reading a code from a predetermined location on a storage medium to distinguish whether or not said predetermined location exists in a read only storage area of the storage medium instead of a rewritable storage area on said storage medium, and to judge whether or not said code matches with a predetermined code; and
    permitting the decoding of the digital content read through a communication network, the permission being made when it is determined as the result of distinction that said location exists in said read only storage area and judgment that said code matches with said predetermined code,
    wherein when said predetermined location exists in said rewritable storage area, said method does not permit execution of said program.

4. A digital content distribution system for reading a digital content from a server, determining whether a program is executable, and processing said digital content, comprising:
    a terminal system including a drive unit for making an access to information in a storage medium mounted thereto, a digital content access permitting section including a judging section connected to said drive unit for reading a code from a predetermined location on said storage medium, and a control section for distinguishing whether said predetermined location exists in a read only storage area of said storage medium instead of a rewritable storage area of said storage medium, wherein said judging section judges whether or not said code matches with a predetermined code, and wherein said digital content access permitting section permits to decode a digital content read through a communication network, the permission being made when it is determined as the result of distinction by said judging section that said predetermined location exists in said read only storage area and judgment that said code matches with said predetermined code; and
    a distributor for transmitting a digital content to said terminal system through the communication network in accordance with a request from said terminal system,
    wherein when said predetermined location exists in said rewritable storage area, execution of said program is not permitted.

5. A removable storage medium comprising a read only storage area and a rewritable storage area, in which said read only storage area has a code stored at a predetermined storage location thereof and said rewritable storage area has a digital content stored therein, said read only storage area having a program code for executing a step of reading said code from said predetermined storage location to distinguish whether or not said predetermined storage location exists in said read only storage area instead of said rewritable storage area and to judge whether or not said code is a predetermined code, and a program code for executing a step of reading, upon determining that said predetermined storage location and said code are valid, said digital content from said rewritable storage area to determine to execute a program or a data reference,
    wherein when said predetermined location exists in said rewritable storage area, execution of said program is not permitted.

6. A digital content distributor for performing the reading and writing of information for a removable storage medium composed of a read only storage area and a rewritable storage area, comprising means for reading information from said storage medium and writing information into said storage medium, storing means for storing a digital content, and processing means for reading a code from a predetermined storage location of said storage medium to distinguish whether or not said predetermined storage location exists in said read only storage area instead of said rewritable storage area to determine whether said digital content is not executable, and to judge whether or not said code is a predetermined code, wherein when said predetermined location exists in said rewritable storage area, execution of said digital content is not permitted.

7. A digital content processor for reading a digital content from a relay system connected to a server, determining whether to permit to decode the digital content, and processing said digital content, comprising:

a drive unit for making an access to information in a storage medium mounted thereto, the storage medium having a read only storage area and a rewritable storage area;

a digital content access permitting section, including a judging section connected to said drive unit for reading a code from a predetermined location on said storage medium, and judging whether or not said code matches with a predetermined code;

a control section for distinguishing whether s predetermined location exists in said read only storage area or in said rewritable storage area;

wherein said digital content access permitting section permits to decode the digital content read from said rewritable storage area of said storage medium, the permission being made when it is determined as the result of distinction by said judging section that said predetermined location exists in said read only storage area and judgment that said code matches with said predetermined code, and wherein when said predetermined location exists in said rewritable storage area, decoding of said digital content is not permitted.

\* \* \* \* \*

UNITED STATES PATENT AND TRADEMARK OFFICE
CERTIFICATE OF CORRECTION

PATENT NO. : 6,751,598 B1
APPLICATION NO. : 08/887251
DATED : June 15, 2004
INVENTOR(S) : Yagawa et al.

It is certified that error appears in the above-identified patent and that said Letters Patent is hereby corrected as shown below:

In the claims, please amend claims 1 and 5 as follows:

10. (Amended) A digital content protection system for reading a digital content from a server, determining whether a program is executable, and processing said digital content, comprising:

a drive unit for making an access to information in a storage medium mounted thereto, the storage medium having a read only storage area and a rewritable storage area;

a digital content access permitting section, including a judging section connected to said drive unit for reading a code from a predetermined location on said storage medium and judging whether or not said code matches with a predetermined code; and a control section for distinguishing whether said predetermined location exists in said read only storage area or in said rewritable storage area to determine that, when said code exists in said read only storage area, said program is executable, wherein information concerning said predetermined location is included at a predetermined position in said digital content, and said storage medium has a plurality of different ~~keys~~ codes at a plurality of predetermined locations on said ~~read only storage area~~ storage medium designated by said predetermined position.

UNITED STATES PATENT AND TRADEMARK OFFICE
CERTIFICATE OF CORRECTION

| | |
|---|---|
| PATENT NO. | : 6,751,598 B1 |
| APPLICATION NO. | : 08/887251 |
| DATED | : June 15, 2004 |
| INVENTOR(S) | : Yagawa et al. |

It is certified that error appears in the above-identified patent and that said Letters Patent is hereby corrected as shown below:

39. (Amended) A removable <u>computer-readable</u> storage medium comprising a read only storage area and a rewritable storage area, in which said ~~read only~~ storage ~~area~~ <u>medium</u> has a code stored at a predetermined storage location thereof and said rewritable storage area has a digital content stored therein, said read only storage area ~~having~~ <u>containing</u> a <u>first</u> program ~~code for executing a stop~~ <u>which, when executed by a computer, causes the computer to perform a method comprising the steps</u> of<u>:</u> reading said code from said predetermined storage location<u>,</u>

<u>distinguishing</u> ~~to distinguish~~ whether or not said predetermined storage location exists in said read only storage area instead of said rewritable storage area<u>,</u> and <u>judging</u> ~~to judge~~ whether or not said code is a predetermined code[,]<u>;</u> and <u>said read only storage medium containing</u> a <u>second</u> program ~~code for executing~~ <u>which, when executed by a computer, causes the computer to perform a method that includes</u> a step of<u>:</u> reading, upon determining that said predetermined storage location <u>exists in said read only storage area</u> and said code ~~are valid~~ <u>is said predetermined code</u>, said digital content from said rewritable storage area to determine to execute a program or a data reference,

UNITED STATES PATENT AND TRADEMARK OFFICE
CERTIFICATE OF CORRECTION

PATENT NO. : 6,751,598 B1
APPLICATION NO. : 08/887251
DATED : June 15, 2004
INVENTOR(S) : Yagawa et al.

It is certified that error appears in the above-identified patent and that said Letters Patent is hereby corrected as shown below:

39. (cont'd).
    wherein when said predetermined location exists in said rewritable storage area, execution of said program <u>or said data reference</u> is not permitted.

Signed and Sealed this

Fifth Day of June, 2007

JON W. DUDAS
*Director of the United States Patent and Trademark Office*